(12) United States Patent
Yasunori et al.

(10) Patent No.: US 10,998,713 B2
(45) Date of Patent: May 4, 2021

(54) RELAY DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Hiromichi Yasunori, Mie (JP); Kosei Maekawa, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 196 days.

(21) Appl. No.: 16/092,635

(22) PCT Filed: Mar. 28, 2017

(86) PCT No.: PCT/JP2017/012656
§ 371 (c)(1),
(2) Date: Oct. 10, 2018

(87) PCT Pub. No.: WO2017/179413
PCT Pub. Date: Oct. 19, 2017

(65) Prior Publication Data
US 2019/0123547 A1    Apr. 25, 2019

(30) Foreign Application Priority Data

Apr. 15, 2016 (JP) .............................. JP2016-081853

(51) Int. Cl.
*H02H 7/18* (2006.01)
*H02H 3/16* (2006.01)
(Continued)

(52) U.S. Cl.
CPC ............. *H02H 7/18* (2013.01); *B60L 3/0046* (2013.01); *B60L 3/04* (2013.01); *B60L 58/20* (2019.02);
(Continued)

(58) Field of Classification Search
CPC .......... H02H 7/18; H02H 1/0007; H02H 3/16; H02H 7/008; H02H 7/16; H02H 9/02;
(Continued)

(56) References Cited

U.S. PATENT DOCUMENTS 6,232,674 B1    5/2001  Frey et al.
7,714,544 B2 *  5/2010  Bolz ..................... H02J 7/0014
                                                    320/166
(Continued)

FOREIGN PATENT DOCUMENTS

JP    H08251711 A      9/1996
JP    2014131374 A     7/2014
JP    2015144525 A     8/2015

OTHER PUBLICATIONS

International Search Report, Application No. PCT/JP2017/012656 dated May 23, 2017.

*Primary Examiner* — Kyle J Moody
*Assistant Examiner* — Lakaisha Jackson
(74) *Attorney, Agent, or Firm* — Honigman LLP (57) ABSTRACT

Provided is a relay device that can switch conduction of a current flow path between power storage units on and off, and can suppress a decrease in the output of the power storage units if an abnormality occurs. A relay device includes: a conductive path between a first power storage unit and a second power storage unit, the conductive path serving as a path through which a current flows; a switch unit that is switched between an ON state in which a current can flow through the conductive path, and an OFF state in which
(Continued)

which the conductive path is in a predetermined no current flow state; a coil that is connected in series to MOSFETs constituting the switch unit, and has an inductance component; and a control unit configured to switch off the switch unit if a value detected by a current detection unit is a predetermined abnormal value.

10 Claims, 3 Drawing Sheets

(51) Int. Cl.
<table>
<tr><td>H02H 9/02</td><td>(2006.01)</td></tr>
<tr><td>B60L 3/04</td><td>(2006.01)</td></tr>
<tr><td>B60L 58/20</td><td>(2019.01)</td></tr>
<tr><td>B60L 3/00</td><td>(2019.01)</td></tr>
<tr><td>H02H 1/00</td><td>(2006.01)</td></tr>
<tr><td>H02H 7/00</td><td>(2006.01)</td></tr>
<tr><td>H02H 7/16</td><td>(2006.01)</td></tr>
<tr><td>H02J 7/14</td><td>(2006.01)</td></tr>
<tr><td>H02J 7/34</td><td>(2006.01)</td></tr>
</table>

(52) U.S. Cl.
CPC ............ *H02H 1/0007* (2013.01); *H02H 3/16* (2013.01); *H02H 7/008* (2013.01); *H02H 7/16* (2013.01); *H02H 9/02* (2013.01); *H02J 7/1423* (2013.01); *H02J 7/345* (2013.01)

(58) Field of Classification Search
CPC B60L 58/20; B60L 3/0046; B60L 3/04; H02J 7/1423; H02J 7/345
See application file for complete search history.

(56) References Cited

U.S. PATENT DOCUMENTS

2017/0225635 A1* 8/2017 Obayashi .............. F02N 11/108
2019/0123545 A1* 4/2019 Maekawa ................ G05F 1/10

* cited by examiner

RELAY DEVICE

CROSS-REFERENCE TO RELATED APPLICATIONS

This application is the U.S. national stage of PCT/JP2017/012656 filed Mar. 28, 2017, which claims priority of Japanese Patent Application No. JP 2016-081853 filed Apr. 15, 2016.

TECHNICAL FIELD

The present disclosure relates to a relay device that controls power supply of power storage devices.

BACKGROUND

JP 2012-130108A discloses an example of an on-board power supply device. The power supply device disclosed in JP 2012-130108A includes a lead storage battery and a lithium storage battery, and is provided with an electrical supply line serving as a power path between the lead storage battery and the lithium storage battery. Two MOSFETs are also provided that switch conduction of the electrical supply line on and off. The power supply device performs control such that the MOSFETs are switched on and off based on the state of charge (SOC) of the lithium storage battery during, for example, non-regeneration (such as idling, acceleration, or steady traveling) so that the SOC is within an optimum range.

According to the technique of JP 2012-130108A, if, for example, an earth fault occurs in the electrical supply line connected between the lead storage battery and the lithium storage battery, a high current will instantaneously flow through the electrical supply line. Accordingly, the voltages output from the lead storage battery and the lithium storage battery decrease instantaneously upon the occurrence of the earth fault, and the output voltages are thus in a significantly low state until the two MOSFETs are switched off to interrupt the high current. Such a significant decrease in the output of the storage batteries due to a high current may cause a problem such as a load becoming inoperative.

The present disclosure was made in view of the aforementioned circumstances, and it is an object thereof to provide a relay device that can switch conduction of a current flow path between power storage units on/off, and can suppress a reduction in the output of the power storage units if an abnormality such as an earth fault occurs, thereby realizing a protection operation.

SUMMARY

According to the present disclosure, a relay device includes a conductive path between a first power storage unit and a second power storage unit, the conductive path serving as a path through which a current flows. A switch unit that is connected to the conductive path is configured to be switched between an ON state in which a current can flow through the conductive path, and an OFF state in which the conductive path is in a predetermined no current flow state. An inductance unit that is connected in series to the switch unit has an inductance component. A detection unit is configured to detect a current flowing through the conductive path. A control unit is configured to switch off the switch unit at least when a value detected by the detection unit is a predetermined abnormal value; and a protective circuit unit configured to suppress a back electromotive force that is generated in the inductance unit when the switch unit is switched off.

Advantageous Effects

According to the present disclosure, if an earth fault or the like has occurred in a current flow path (conductive path) between the first power storage unit and the second power storage unit or a portion electrically connected to this conductive path, and the current flowing through the conductive path is abnormal, protection can be achieved by switching the switch unit to the OFF state. Furthermore, the inductance unit is connected in series to the switch unit, and thus, when a current flows from any one of the power storage units toward the position at which the earth fault occurred via the inductance unit and the switch unit, the rate of increase in this current can be suppressed. Accordingly, a decrease in the voltage of the corresponding power storage unit can be suppressed up until the off operation (protection operation) on the conductive path by the switch unit is complete, so that a problem caused by a decrease in the output of that power storage unit is unlikely to occur.

Furthermore, according to this configuration, it is possible to realize a configuration that diminishes, using the inductance unit, the rate of increase in the discharge current that flows from a power storage unit in the event of a short circuit or the like, while suppressing, using the protective circuit unit, a back electromotive force that is generated in the inductance unit when the switch unit is switched off. Accordingly, it is possible to avoid problems (such as breakage of the switch unit) caused by the back electromotive force.

DETAILED DESCRIPTION OF PREFERRED EMBODIMENTS

In the present disclosure, the switch unit may include: a first semiconductor switch provided with a first element unit that is switched between an ON state and an OFF state, and a first diode unit connected in parallel to the first element unit; and a second semiconductor switch provided with a second element unit that is switched between an ON state and an OFF state, and a second diode unit that is connected in parallel to the second element unit and is arranged inversely with respect to the first diode unit.

According to this configuration, it is possible to interrupt a bi-directional current flow on the conductive path. If an earth fault or the like has occurred at a position, on the second power storage unit side, of the conductive path or a portion electrically connected to this conductive path, the rate of increase in the discharge current that is to flow from the first power storage unit toward the position at which the earth fault occurred is diminished by the inductance unit, and thus a sudden decrease in the voltage of the first power storage unit can be suppressed. In this case, a decrease in the voltage of the first power storage unit can be suppressed up until the off operation (protection operation) on the conductive path by the switch unit is complete, so that a problem caused by a decrease in the output of the first power storage unit is unlikely to occur. Alternatively, if an earth fault or the like has occurred at a position, on the first power storage unit side, of the conductive path or a portion electrically connected to this conductive path, the rate of increase in the discharge current that is to flow from the second power storage unit toward the position at which the earth fault occurred is diminished by the inductance unit, and thus a sudden decrease in the voltage of the second power storage unit is suppressed. In this case, a decrease in the voltage of the second power storage unit can be suppressed up until the off operation (protection operation) on the conductive path by the switch unit is complete, so that a problem caused by a decrease in the output of the second power storage unit is unlikely to occur.

In the present disclosure, the inductance unit may be connected between the first semiconductor switch and the second semiconductor switch, the inductance unit being connected in series to the first semiconductor switch and the second semiconductor switch.

The protective circuit unit may be configured to suppress a back electromotive force that is generated in the inductance unit when the switch unit is switched off in a state in which a current is flowing through the conductive path in a first direction from any one of the first power storage unit and the second power storage unit to the other one, and to suppress a back electromotive force that is generated in the inductance unit when the switch unit is switched off in a state in which a current is flowing through the conductive path in a second direction, which is the reverse direction of the first direction.

According to this configuration, it is possible to interrupt a current flowing through the conductive path in either of the first direction or the second direction, and to suppress a back electromotive force that is generated when a current flowing in either direction is interrupted, making it possible to more reliably avoid problems (such as breakage of the switch unit) caused by the back electromotive force.

In the present disclosure, a plurality of series configuration units, in each of which the switch unit and the inductance unit are connected in series to each other, may be connected in parallel to each other between the first power storage unit and the second power storage unit.

According to this configuration, it is possible to realize a configuration in which a higher current can flow between the first power storage unit and the second power storage unit, with a downsized switch unit and a downsized inductance unit.

Embodiment 1

Hereinafter, Embodiment 1, which is an embodiment of the present disclosure, will be described.

Figure 1:
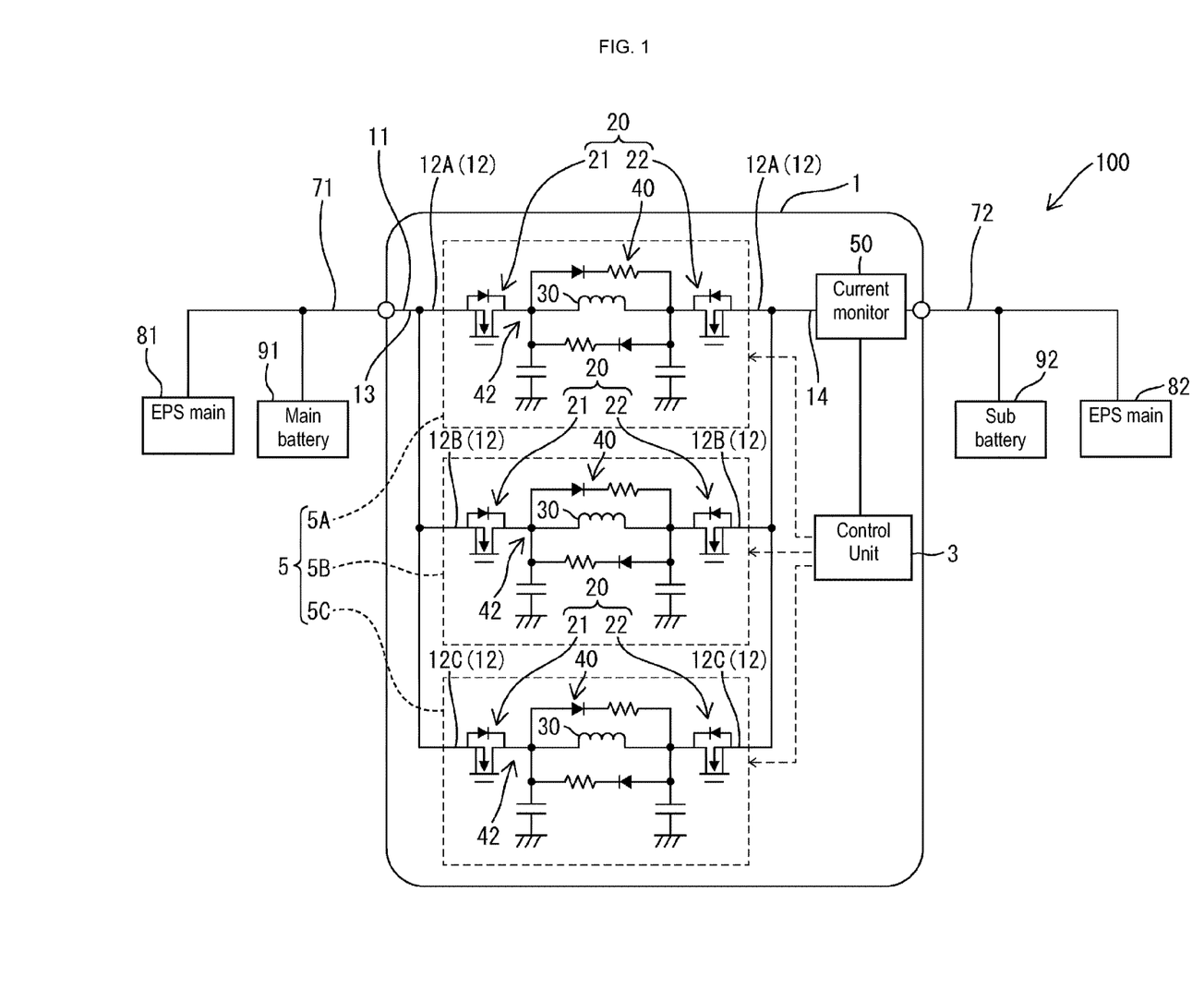
FIG. 1 is a circuit diagram schematically illustrating an example of an on-board power supply system provided with a relay device according to Embodiment 1.

An on-board power supply system 100 shown in FIG. 1 is configured as an on-board power supply system provided with a plurality of electric power supplies (a first power storage unit 91 and a second power storage unit 92). A relay device 1 constitutes part of the on-board power supply system 100 and has a function of switching a path between the first power storage unit 91 (main battery) and a second power storage unit 92 (sub battery) between a current flow state and a no current flow state.

The following will describe, as a representative example of the on-board power supply system 100, a configuration that includes a main load 81, which serves as a first load, and a sub load 82, which serves as a second load, the main load 81 and the sub load 82 having the same function. Note however that this configuration is merely a representative example, and the application of the relay device 1 is not limited to this configuration.

The main load 81 is, for example, a motorized power steering system, and is configured to be supplied with electric power from the first power storage unit 91 so that an electric component such as a motor can operate. The sub load 82 is a motorized power steering system that has the same configuration and function as those of the main load 81. The on-board power supply system 100 is configured as a system in which, if the main load 81 malfunctions, the sub load 82 operates in place of the main load 81 so that the function of the main load 81 can be maintained even if the main load 81 malfunctions.

The first power storage unit 91 is a power supply unit that can supply electric power to the main load 81, and is made of a well-known power source such as a lead battery, for example. The second power storage unit 92 is a power supply unit that can supply electric power to the sub load 82, and is made of a well-known power source such as a lithium-ion battery or an electric double layer capacitor, for example.

The first power storage unit 91 and the main load 81 are connected to a wiring 71 provided outside of the relay device 1, the wiring 71 being connected to a not-shown electric generator. The second power storage unit 92 and the sub load 82 are connected to a wiring 72 provided outside of the relay device 1. The wiring 71 is connected to a common conductive path 13 included in a later-described conductive path 11, and the wiring 72 is connected to a common conductive path 14 included in the later-described conductive path 11. The first power storage unit 91 is charged with electric power generated by the electric generator. If a separate relay 5 is in an ON state (in which an electric current can flow), the second power storage unit 92 is charged with electric power generated by the electric generator or electric power from the first power storage unit 91.

The relay device 1 is provided with the conductive path 11, a plurality of separate relays 5 (separate relays 5A, 5B, and 5C), a current detection unit 50, and a control unit 3.

The conductive path 11 is a portion serving as a current flow path between the first power storage unit 91 and the second power storage unit 92. The conductive path 11 includes the common conductive path 13 on the first power storage unit 91 side, the common conductive path 14 on the second power storage unit 92 side, and a plurality of parallel conductive paths 12 (individual conductive paths) connected between the common conductive paths 13 and 14. The conductive path 11 is a power line, and serves as a current flow path through which an electric current from the first power storage unit 91 or the not-shown electric generator flows to the second power storage unit 92. Furthermore, in some cases, the conductive path 11 may also serve as a path through which a current discharged from the second power storage unit 92 flows to the wiring 71 side. The common conductive path 13 is connected to the wiring 71 on the first power storage unit 91 side, and is electrically connected to the first power storage unit 91 via the wiring 71. The common conductive path 14 is connected to the wiring 72 on the second power storage unit 92 side, and is electrically connected to the second power storage unit 92 via the wiring 72. The parallel conductive paths 12 are current flow paths connected in parallel to each other between the common conductive paths 13 and 14, and serve as portions at which a current flowing through the conductive path 11 is branched.

Figure 2:
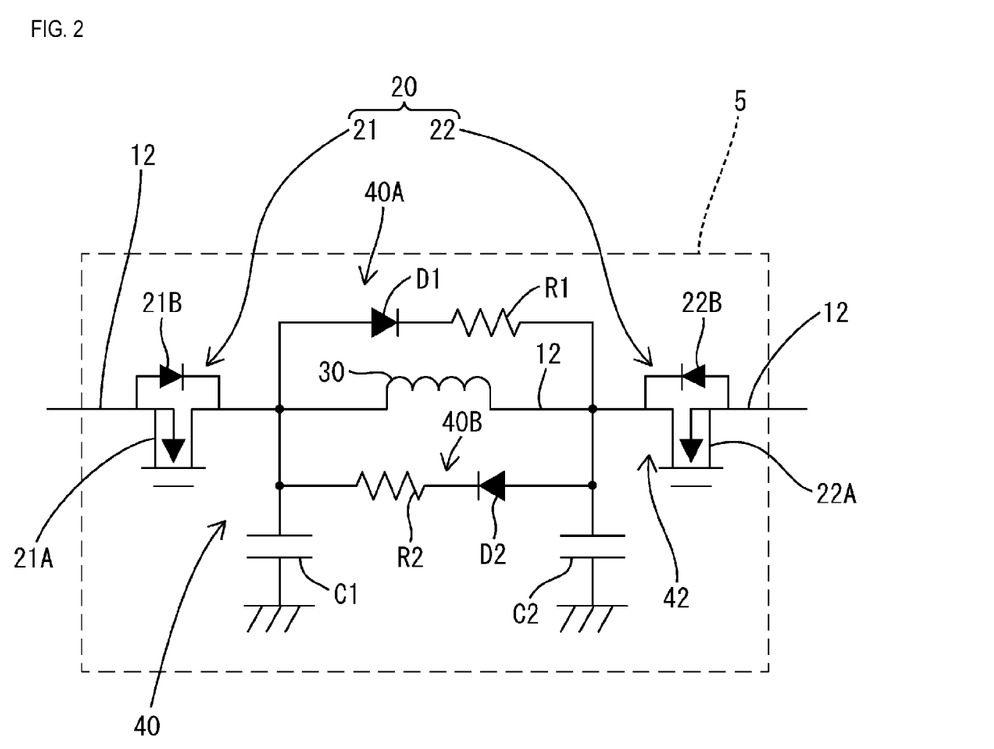
FIG. 2 is a circuit diagram illustrating a separate relay that constitutes part of the relay device according to Embodiment 1.

The three separate relays 5 are connected in parallel to each other between the common conductive path 13 and the common conductive path 14, and each of the separate relays 5 is constituted by one of the above-described parallel conductive paths 12 and a plurality of associated electronic components. Each of the three separate relays 5 has a function of causing, when in the ON state, a current to flow between the common conductive path 13 and the common conductive path 14, and interrupting, when in the OFF state, the current flow between the common conductive path 13 and the common conductive path 14. In FIG. 1, of the three separate relays 5, the first separate relay is denoted by the reference numeral 5A, the second separate relay is denoted by the reference numeral 5B, and the third separate relay is denoted by the reference numeral 5C. These three separate relays 5 have the same circuit configuration, and FIG. 2 shows a common circuit configuration of the three separate relays 5. Furthermore, in FIG. 1, of the parallel conductive paths 12 provided in parallel to each other, the parallel conductive path 12 that constitutes part of the first separate relay 5A is denoted by the reference numeral 12A, the parallel conductive path 12 that constitutes part of the second separate relay 5B is denoted by the reference numeral 12B, and the parallel conductive path 12 that constitutes part of the third separate relay 5C is denoted by the reference numeral 12C.

As shown by FIG. 2, the separate relays 5 each have a series configuration unit 42, in which a switch unit 20 and a coil 30 (inductance unit) are connected in series to each other, and a protective circuit unit 40 that exerts a protective effect when the switch unit 20 is switched off. The series configuration unit 42 is a portion that includes two N-channel type MOSFETs 21 and 22, and the coil 30 (inductance unit) arranged between these two MOSFETs 21 and 22, and has a configuration in which the two MOSFETs 21 and 22 are connected in series to the coil 30. As shown in FIG. 1, the relay device 1 has a configuration in which a plurality of series configuration units 42, in each of which a switch unit 20 (two MOSFETs 21 and 22) and a coil 30 are connected in series to each other, are connected in parallel to each other between the first power storage unit 91 and the second power storage unit 92.

In the relay device 1, two MOSFETs 21 and 22 that are provided in each of the plurality of separate relays 5 constitute a switch unit 20. Specifically, when all of the switch units 20 are in the OFF state, that is, all of the pairs of two MOSFETs 21 and 22 provided in the plurality of separate relays 5 are in the OFF state, the current flowing through the conductive path 11 is interrupted. In this way, the state in which all of the pairs of two MOSFETs 21 and 22 are undergoing an off operation corresponds to the "OFF state" in which the conductive path 11 is in a predetermined no current flow state, and in this state, conduction between the wiring 71 and the wiring 72 is interrupted. Alternatively, the state in which at least one of the pairs of MOSFETs 21 and 22 is in the ON state, that is, at least one of the separate relays 5 is undergoing an on operation corresponds to the "ON state" in which a current can flow through the conductive path 11, that is, the path between the wiring 71 and the wiring 72 is conductive.

As shown in FIG. 2, the MOSFET 21 is provided with a first element unit 21A that is switched between an ON state and an OFF state, and a body diode 21B (parasitic diode) connected in parallel to the first element unit 21A. Specifically, the portion of the MOSFET 21 excluding the body diode 21B corresponds to the first element unit 21A. The "ON state" of the first element unit 21A refers to the state in which a current can flow between the drain and the source of the MOSFET 21 via a channel, and the "OFF state" of the first element unit 21A refers to a state in which no current can flow via the channel. The body diode 21B corresponds to an example of a first diode unit. The MOSFET 22 is provided with a second element unit 22A that is switched between an ON state and an OFF state, and a body diode 22B (parasitic diode) connected in parallel to the second element unit 22A. Specifically, the portion of the MOSFET 22 excluding the body diode 22B corresponds to the second element unit 22A. The "ON state" of the second element unit 22A refers to a state in which a current can flow between the drain and the source of the MOSFET 22 via a channel, and the "OFF state" of the second element unit 22A refers to the state in which no current can flow via the channel. The body diode 22B corresponds to an example of a second diode unit.

The coil 30 corresponds to an example of an inductance unit that has an inductance component. The coil 30 (inductance unit) is connected between the MOSFET 21 and the MOSFET 22, the coil 30 being connected in series to these MOSFETs 21 and 22. The effects and functions of the coil 30 will be described later.

The protective circuit unit 40 shown in FIG. 2 is configured as a circuit for suppressing a back electromotive force that is generated in the coil 30 (inductance unit) when the switch unit 20 is switched off. The protective circuit unit 40 includes resistance units R1 and R2, diodes D1 and D2, and capacitors C1 and C2, and is configured as a snubber circuit. Specifically, a first circuit unit 40A, in which the diode D1 and the resistance unit R1 are connected in series to each other, and a second circuit unit 40B, in which the diode D2 and the resistance unit R2 are connected in series to each other, are connected in parallel to the coil 30. The capacitor C1 is connected between one end of the coil 30 and the ground, and the capacitor C2 is connected between the other end of the coil 30 and the ground. In the first circuit unit 40A, the anode of the diode D1 is connected to one end of the coil, and in the second circuit unit 40B, the anode of the diode D2 is connected to the other end of the coil.

In the separate relay 5 shown in FIG. 2, in a state in which both of the MOSFETs 21 and 22 are kept in the ON state and a current is flowing through the parallel conductive path 12 in a direction from the first power storage unit 91 side to the second power storage unit 92 side (first direction), if both of the MOSFETs 21 and 22 are switched to the OFF state, a back electromotive force will be generated in the coil 30 (inductance unit). At this time, it is possible to suppress the back electromotive force by subjecting the current of the coil 30 to reflux in the second circuit unit 40B. Conversely, if both of the MOSFETs 21 and 22 are switched off in a state in which a current is flowing through the parallel conductive path 12 in a direction from the second power storage unit 92 side toward the first power storage unit 91 side (second direction), a back electromotive force will be generated in the coil 30 (inductance unit). At this time, it is possible to suppress the back electromotive force by subjecting the current of the coil 30 to reflux in the first circuit unit 40A.

The current detection unit 50 shown in FIG. 1 is configured as a well-known current detection circuit (current monitor). This current detection unit 50 is configured to output the value of a current flowing through the common conductive path 14 as a detected value, and the current value detected by the current detection unit 50 is to be input to the control unit 3.

The control unit 3 is, for example, a microcomputer provided with a CPU, a ROM, a RAM, and an A/D converter. The detected value (value of a current flowing through the common conductive path 14) is input from the current detection unit 50 to the control unit 3, and the input current value is converted into a digital value by the A/D converter included in the control unit 3. The control unit 3 has a function of controlling switching-on/off of the switch units 20 (MOSFETs 21 and 22) of the separate relays 5, that is, the control unit 3 functions to switch off, for example, all of the switch units 20 of the separate relays 5 if the value (current value) detected by the current detection unit 50 is a predetermined abnormal value, to interrupt the current flowing through the conductive path 11.

Here, a basic operation of the relay device 1 in a normal state will be described.

In the relay device 1, the control unit 3 controls switching-on/off of the switch units 20 (specifically, the pairs of MOSFETs 21 and 22 provided in the separate relays 5). If a predetermined ON condition is met, the control unit 3 performs control to switch on all of the pairs of MOSFETs 21 and 22 provided in all of the separate relays 5. When the MOSFETs 21 and 22 are switched on in this way, the path between the first power storage unit 91 and the second power storage unit 92 is conductive. The timing at which the control unit 3 performs control to switch on the plurality of switch units 20 is not particularly limited. For example, the control unit 3 may also be configured to continuously monitor the voltage output from the second power storage unit 92, and perform control to switch on all of the switch units 20 (MOSFETs 21 and 22) included in all of the separate relays 5 if the voltage output from the second power storage unit 92 has decreased to a value lower than a predetermined voltage threshold. In other words, the control unit 3 may perform control to switch the conductive path 11 to the conductive state if the voltage output from the second power storage unit 92 has decreased, so that the second power storage unit 92 is charged with the electric power from the electric generator or the first power storage unit 91. Of course, the switch units 20 may also be switched on at another timing.

Furthermore, if a predetermined OFF condition is met, the control unit 3 performs control to switch off all of the pairs of MOSFETS 21 and 22 included in the separate relays 5. The number of conditions under which the control unit 3 performs control to switch off all of the switch units 20 is not limited to one. For example, the control unit 3 may also be configured to perform control to switch off all of the switch units 20 (MOSFETs 21 and 22) included in all of the separate relays 5 if the output voltage of the second power storage unit 92 is equal to or greater than the predetermined voltage threshold (that is, if the second power storage unit 92 is sufficiently charged). Of course, the switch units 20 may also be switched off at another timing.

The following will describe an operation of the relay device 1 in an abnormal state.

If a predetermined abnormal state has occurred, the control unit 3 performs control to forcibly switch off all of the switch units 20 (MOSFETs 21 and 22) included in all of the separate relays 5. Specifically, the control unit 3 continuously monitors detected values (current value) input from the current detection unit 50, and performs control to switch off all of the pairs of MOSFETs 21 and 22 included in the separate relays 5 if the current value input from the current detection unit 50 exceeds a predetermined current threshold (that is, if the conductive path 11 is in a predetermined overcurrent state).

For example, if an earth fault has occurred in the wiring 72 connected to the second power storage unit 92 (sub battery) and the potential at a predetermined position of the wiring 72 has changed to a potential close to the ground potential, a high current flows into the portion in which the earth fault has occurred from the first power storage unit 91 (main battery) side via the conductive path 11. In this case, the current flowing through the conductive path 11 increases relative to that prior to the occurrence of the earth fault, and thus the value (current value) detected by the current detection unit 50 also increases to an abnormal value that is larger than the current threshold. Accordingly, if the value (current value) detected by the current detection unit 50 is an abnormal value, the control unit 3 switches off all of the pairs of MOSFETs 21 and 22 included in all of the separate relays 5, to interrupt the current flow through the conductive path 11.

Furthermore, the relay device 1 is configured such that no high current occurs instantaneously in the event of such an earth fault, thereby suppressing the amount of current flowing through the conductive path 11 up until all of the switch units 20 are switched off by the control unit 3 (that is, up until all of the MOSFETs 21 and 22 included in all of the separate relays 5 are switched off). Specifically, the parallel conductive paths 12 (power lines) of the plurality of separate relays 5 each include a coil 30, and the inductance components of the coils 30 suppress an instantaneous increase in the amount of current upon occurrence of an earth fault.

Figure 3:
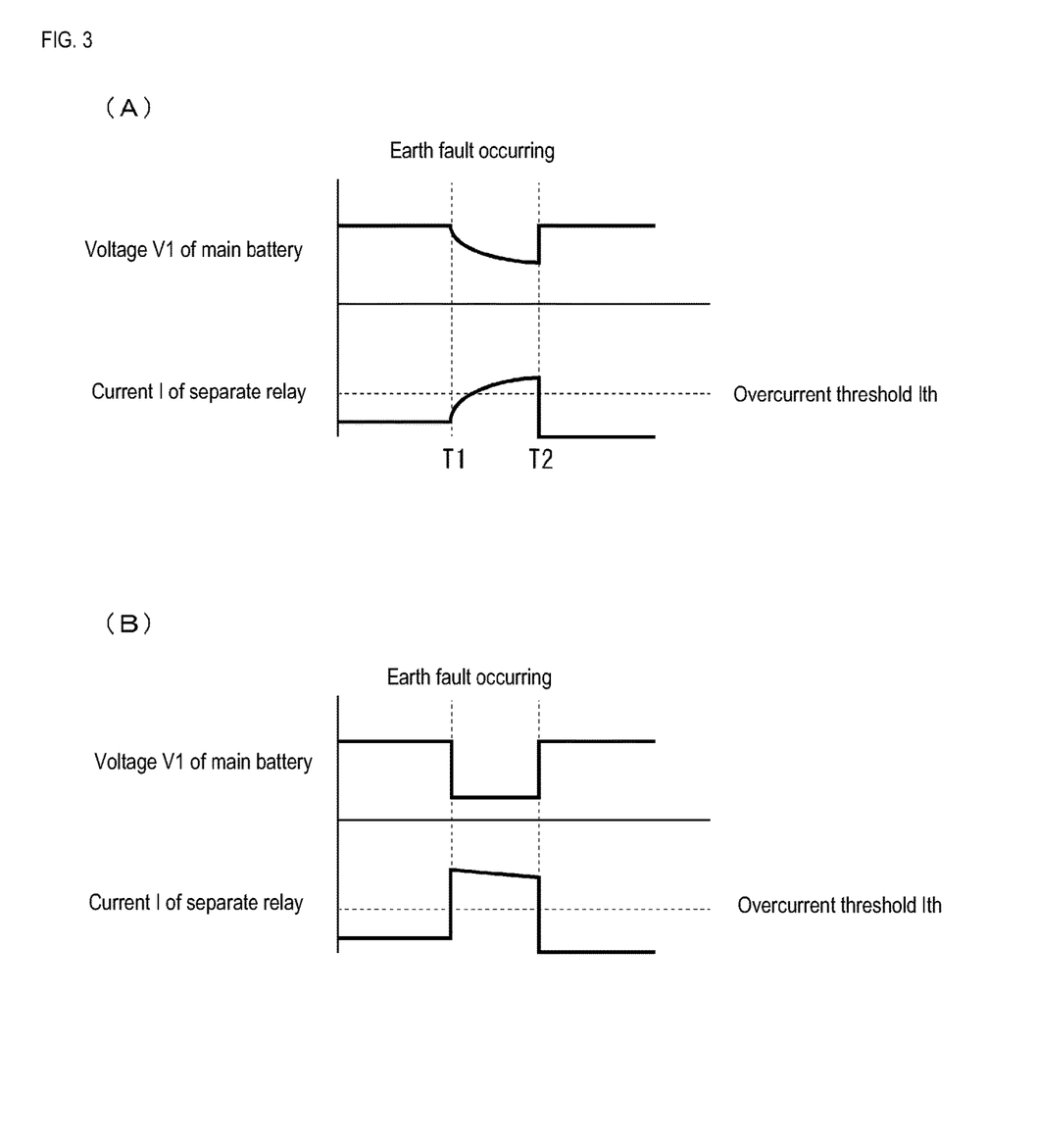
FIG. 3(A) is a timing diagram illustrating examples of changes in the voltage of a main battery (first power storage unit) and in the current of the separate relay before and after an earth fault that occurred on a sub battery (second power storage unit) side of the relay device of Embodiment 1.
FIG. 3(B) is a timing diagram of a comparative example.

FIG. 3(A) shows a relationship between a voltage V1 of the first power storage unit 91 (main battery) and a current I flowing from the wiring 71 to the wiring 72 via the conductive path 11 (current flowing through the plurality of separate relays 5) when an earth fault has occurred in the wiring 72 connected to the second power storage unit 92 (sub battery). FIG. 3(A) shows a case where all of the switch units 20 have been switched to the ON state prior to an earth fault occurrence time T1, and an earth fault has occurred in the wiring 72 on the second power storage unit 92 (sub battery) side at the time T1 at which all of the switch units 20 are in the ON state. In this case, after the earth fault occurrence time T1, a current flows from the first power storage unit 91 (main battery) side into the portion of the wiring 72 in which the earth fault has occurred, and thus the current I increases after the earth fault occurrence time T1. However, the coils 30 provided in the parallel conductive paths 12 suppress an instantaneous and sudden increase in the current flowing through the parallel conductive paths 12, and thus the current flowing through the plurality of separate relays 5 (current I flowing through the conductive path 11) increases gradually. Then, when the current I flowing through the conductive path 11 reaches a predetermined current threshold Ith, the control unit 3 performs off control with respect to all of the switch units 20 so as to switch all of the switch units 20 to the OFF state at a time T2. In this configuration, the current I flowing through the conductive path 11 increases gradually instead of suddenly during a time period from the earth fault occurrence time T1 to the time T2 at which the off operations of all of the switch units 20 are complete, and the voltage of the first power storage unit 91 (main battery) decreases gradually instead of suddenly during the time period from the earth fault occurrence time T1 to the time T2 at which the off operations of all of the switch units 20 are complete. In other words, it is possible to suppress a sudden decrease in the voltage of the first power storage unit 91 (main battery) immediately after the occurrence of an earth fault, and to avoid such a situation in which the voltage of the first power storage unit 91 (main battery) is drastically reduced before all of the switch units 20 are switched to the OFF state, thus making it possible to solve the problem (such as ECU reset) that may be caused by a drastic reduction in the voltage of the first power storage unit 91 (main battery).

Note that FIG. 3(B) shows a relationship between the voltage V1 of the first power storage unit 91 (main battery) and the current I flowing from the wiring 71 to the wiring 72 via the conductive path 11, when a similar earth fault has occurred in a configuration in which the coils 30 and the protective circuit units 40 are omitted from the separate relays 5 of the relay device 1 shown in FIG. 1, and the MOSFETs 21 and 22 are simply directly connected to each other. As shown in FIG. 3(B), in the configuration in which no coil 30 is provided, if an earth fault has occurred in the wiring 72, the amount of current increases instantaneously and suddenly from the point in time at which the earth fault has occurred, and the voltage V1 of the first power storage unit 91 (main battery) decreases instantaneously and suddenly. In this configuration, before all of the switch units are switched to the OFF state through the control of the control unit, the voltage of the first power storage unit significantly decreases, and thus there is the risk of a problem such as an ECU reset. Such a problem should be avoided particularly for advanced driving function cars (such as automated cars). In contrast, the relay device 1 of the present configuration achieves a relationship as shown in FIG. 3(A), and thus such a problem can be solved.

Such effects are also achieved in a case where an earth fault has occurred on the first power storage unit 91 (main battery) side. For example, if an earth fault has occurred in the wiring 71 connected to the first power storage unit 91 (main battery) and the potential at a predetermined position of the wiring 71 has changed to a potential close to the ground potential, a high current flows into the portion at which the earth fault has occurred from the second power storage unit 92 (sub battery) side via the conductive path 11. In this case, the current flowing through the conductive path 11 increases relative to that prior to the occurrence of the earth fault, and thus the value (current value) detected by the current detection unit 50 also increases to an abnormal value that is larger than the current threshold. Accordingly, if the value (current value) detected by the current detection unit 50 is an abnormal value, the control unit 3 switches off all of the pairs of MOSFETs 21 and 22 included in all of the separate relays 5, to interrupt the current flowing through the conductive path 11.

In this way, even when an earth fault has occurred in the first power storage unit 91 (main battery), it is possible to suppress, using the inductance components of the coils 30, an instantaneous increase in current due to the occurrence of the earth fault. If an earth fault has occurred on the first power storage unit 91 (main battery) side, a current will flow, after the occurrence of the earth fault, from the second power storage unit 92 (sub battery) side into the portion of the wiring 71 at which the earth fault has occurred, and thus the current I will increase after the occurrence of the earth fault. However, the coils 30 provided in the parallel conductive paths 12 suppress an instantaneous and sudden increase in the current flowing through the parallel conductive paths 12, and thus the current I flowing through the conductive path 11 (current flowing through the plurality of separate relays 5) will increase gradually. Then, when the current I flowing through the conductive path 11 reaches the predetermined current threshold Ith, the control unit 3 performs off control with respect to all of the switch units 20 so as to switch off all of the switch units 20. Accordingly, it is possible to suppress a sudden decrease in the voltage of the second power storage unit 92 (sub battery) immediately after the occurrence of the earth fault, and to avoid such a situation in which the voltage of the second power storage unit 92 (sub battery) is drastically reduced before all of the switch units 20 are switched to the OFF state.

As described above, in the relay device 1 of the present configuration, if an earth fault or the like has occurred in a current flow path (conductive path) between the first power storage unit 91 and the second power storage unit 92 or a portion electrically connected to this conductive path, and the current flowing through the conductive path 11 has become abnormal, protection can be achieved by switching the switch units 20 to the OFF state. Furthermore, each coil 30 (inductance unit) is connected in series to the switch unit 20, and thus, when a current flows from any of the power storage units toward the portion at which the earth fault has occurred via the coil 30 and the switch unit 20, the rate of increase in the current can be suppressed. Accordingly, a decrease in the voltage of the corresponding power storage unit can be suppressed up until the off operation (protection operation) on the conductive path 11 by the switch unit 20 is complete, so that a problem caused by a decrease in the output of that power storage unit is unlikely to occur.

The switch units 20 provided on the parallel conductive paths 12 constituting the conductive path 11 each include a MOSFET 21 and a MOSFET 22. The MOSFET 21 is provided with the first element unit 21A that is switched between an ON state and an OFF state, and a body diode 21B (first diode unit) connected in parallel to the first element unit 21A. The MOSFET 22 is provided with the second element unit 22A that is switched between an ON state and an OFF state, and a body diode 22B (second diode unit) that is connected in parallel to the second element unit 22A and is arranged inversely with respect to the body diode 21B (first diode unit). According to this configuration, it is possible to interrupt a bi-directional current flow on the conductive path 11. If an earth fault or the like has occurred at a position, on the second power storage unit 92 side, of the conductive path 11, the rate of increase in the discharge current that is to flow from the first power storage unit 91 toward the position at which the earth fault occurred is diminished by the coils 30 (inductance units), and thus a sudden decrease in the voltage of the first power storage unit 91 is suppressed. In this case, a decrease in the voltage of the first power storage unit 91 can be suppressed up until the off operation (protection operation) on the conductive path 11 by the switch units 20 is complete, so that a problem (such as ECU reset) caused by a decrease in the output of the first power storage unit 91 is unlikely to occur. Alternatively, if an earth fault or the like has occurred at a position, on the first power storage unit 91 side, of the conductive path 11, the rate of increase in the discharge current that is to flow from the second power storage unit 92 toward the position at which the earth fault occurred is diminished by the coils 30 (inductance units), and thus a sudden decrease in the voltage of the second power storage unit 92 can be suppressed. In this case, a decrease in the voltage of the second power storage unit 92 can be suppressed up until the off operation (protection operation) on the conductive path 11 by the switch units 20 is complete, so that a problem caused by a decrease in the output of the second power storage unit 92 is unlikely to occur.

The relay device 1 includes the protective circuit units 40 that suppress a back electromotive force that is generated in the coils 30 (inductance units) when the switch units 20 are switched off. According to this configuration, it is possible to realize a configuration that diminishes, using the coils 30 (inductance units), the rate of increase in the discharge current that flows from the power storage unit in the event of a short circuit or the like, while suppressing, using the protective circuit units 40, a back electromotive force that is generated in the coils 30 (inductance units) when the switch units 20 are switched off. Accordingly, it is possible to avoid problems (such as breakage of the switch units 20) caused by the back electromotive force.

Specifically, the protective circuit units 40 have a function of suppressing a back electromotive force that is generated in the coils 30 (inductance units) when the switch units 20 are switched off in a state in which a current is flowing through the conductive path 11 in the first direction. Furthermore, the protective circuit units 40 also have a function of suppressing a back electromotive force that is generated in the coils 30 (inductance units) when the switch units 20 are switched off in a state in which a current is flowing through the conductive path 11 in the second direction, which is the reverse direction of the first direction. According to this configuration, it is possible to interrupt a current flowing through the conductive path 11 in either of the first direction or the second direction, and to suppress a back electromotive force when a current flowing in either direction is interrupted, making it possible to more reliably avoid problems (such as breakage of the switch units) caused by the back electromotive force.

In the relay device 1, the plurality of series configuration units 42, in each of which the switch unit 20 and the coil 30 (inductance unit) are connected in series to each other, are connected in parallel to each other between the first power storage unit 91 and the second power storage unit 92. According to this configuration, it is possible to realize a configuration in which a higher current can flow between the first power storage unit 91 and the second power storage unit 92, with downsized switch units 20 and downsized coils 30 (inductance units).

Other Embodiments

The present disclosure is not limited to the embodiment described with reference to the description above and the drawings, and the technical scope of the present disclosure encompasses, for example, the following embodiments.

Although, in the above-described Embodiment 1, actuators (for example, motorized power steering systems) that require redundancy are exemplified as the main load 81 and the sub load 82, they may be other components. For example, the main load 81 may be configured as a sensing device such as a radar, ultrasonic sensor or a camera, and the sub load 82 may be configured as a backup sensing device that has the same function as this. Furthermore, the load connected to the first power storage unit 91 side, and the load connected to the second power storage unit 92 side may have different functions.

Although the above-described Embodiment 1 shows an example in which the number of the separate relays 5 is three, one separate relay 5 or three or more separate relays 5 may be provided.

Although the above-described Embodiment 1 shows an example in which the switch unit 20 arranged in each separate relay 5 is made of two MOSFETs 21 and 22, the switch unit 20 may be made of semiconductor switches other than MOSFETs. Furthermore, the configuration of the separate relay 5 is not limited to a configuration in which two semiconductor switches are arranged in series to the coil 30, and a configuration is also possible in which one semiconductor switch element is connected in series to the coil 30, or three or more semiconductor switch elements may be connected in series to the coil 30. Moreover, the switch units 20 may be mechanical relays.

The invention claimed is:

1. A relay device comprising:
a conductive path between a first power storage unit and a second power storage unit, the conductive path serving as a path through which a current flows;
a switch unit that is connected to the conductive path, and is configured to be switched between an ON state in which the current can flow through the conductive path, and an OFF state in which the conductive path is in a predetermined no current flow state;
an inductance unit that is connected in series to the switch unit, and has an inductance component;
a detection unit configured to detect the current flowing through the conductive path;
a control unit configured to switch off the switch unit at least when a value detected by the detection unit is a predetermined abnormal value; and
a protective circuit unit configured to suppress a back electromotive force that is generated in the inductance unit when the switch unit is switched off, the protective circuit unit having a first circuit unit and a second circuit unit, each end of the first circuit unit and second circuit unit are connected to each other in parallel, wherein the inductance unit is interposed between the first circuit unit and the second circuit unit, wherein the protective circuit unit is configured to reflux the back electromotive force to from the inductance unit into one of either the first circuit unit and the second circuit unit.

2. The relay device according to claim 1, wherein the switch unit includes: a first semiconductor switch provided with a first element unit that is switched between an ON state and an OFF state, and a first diode unit connected in parallel to the first element unit; and a second semiconductor switch provided with a second element unit that is switched between an ON state and an OFF state, and a second diode unit that is connected in parallel to the second element unit and is arranged inversely with respect to the first diode unit.

3. The relay device according to claim 2, wherein the inductance unit is connected between the first semiconductor switch and the second semiconductor switch, the inductance unit being connected in series to the first semiconductor switch and the second semiconductor switch.

4. The relay device according to claim 3, wherein the protective circuit unit is configured to suppress the back electromotive force that is generated in the inductance unit when the switch unit is switched off in a state in which the current is flowing through the conductive path in a first direction from any one of the first power storage unit and the second power storage unit to the other one, and to suppress the back electromotive force that is generated in the inductance unit when the switch unit is switched off in a state in which the current is flowing through the conductive path in a second direction, which is a reverse direction of the first direction.

5. The relay device according to claim 3, wherein a plurality of series configuration units, in each of which the switch unit and the inductance unit are connected in series to each other, are connected in parallel to each other between the first power storage unit and the second power storage unit.

6. The relay device according to claim 2, wherein the protective circuit unit is configured to suppress the back electromotive force that is generated in the inductance unit when the switch unit is switched off in a state in which the current is flowing through the conductive path in a first direction from any one of the first power storage unit and the second power storage unit to the other one, and to suppress the back electromotive force that is generated in the inductance unit when the switch unit is switched off in a state in which the current is flowing through the conductive path in a second direction, which is a reverse direction of the first direction.

7. The relay device according to claim 2, wherein a plurality of series configuration units, in each of which the switch unit and the inductance unit are connected in series to each other, are connected in parallel to each other between the first power storage unit and the second power storage unit.

8. The relay device according to claim 1, wherein the protective circuit unit is configured to suppress the back electromotive force that is generated in the inductance unit when the switch unit is switched off in a state in which the current is flowing through the conductive path in a first direction from any one of the first power storage unit and the second power storage unit to the other one, and to suppress the back electromotive force that is generated in the inductance unit when the switch unit is switched off in a state in which the current is flowing through the conductive path in a second direction, which is a reverse direction of the first direction.

9. The relay device according to claim 8, wherein a plurality of series configuration units, in each of which the switch unit and the inductance unit are connected in series to each other, are connected in parallel to each other between the first power storage unit and the second power storage unit.

10. The relay device according to claim 1, wherein a plurality of series configuration units, in each of which the switch unit and the inductance unit are connected in series to each other, are connected in parallel to each other between the first power storage unit and the second power storage unit.

* * * * *